United States Patent
Ooshima

(10) Patent No.: US 10,851,902 B2
(45) Date of Patent: Dec. 1, 2020

(54) CROSS-FLOW DUAL VALVE AND METHOD OF MANUFACTURING HOUSING OF THE CROSS-FLOW DUAL VALVE

(71) Applicant: Azbil TA Co., Ltd., Itabashi-ku (JP)

(72) Inventor: Akiyoshi Ooshima, Itabashi-ku (JP)

(73) Assignee: Azbil TA Co., Ltd., Itabashi-ku (JP)

(*) Notice: Subject to any disclaimer, the term of this patent is extended or adjusted under 35 U.S.C. 154(b) by 0 days.

(21) Appl. No.: 16/535,559

(22) Filed: Aug. 8, 2019

(65) Prior Publication Data
US 2020/0063877 A1 Feb. 27, 2020

(30) Foreign Application Priority Data
Aug. 24, 2018 (JP) ................. 2018-156993

(51) Int. Cl.
*F16K 11/22* (2006.01)
*F16K 11/24* (2006.01)

(52) U.S. Cl.
CPC ............. *F16K 11/22* (2013.01); *F16K 11/24* (2013.01)

(58) Field of Classification Search
USPC ............................................ 137/596, 596.16
See application file for complete search history.

(56) References Cited

U.S. PATENT DOCUMENTS

| | | | | |
|---|---|---|---|---|
| 3,757,818 A * | 9/1973 | Sweet | .................. | B30B 15/142 137/596.16 |
| 4,542,767 A * | 9/1985 | Thornton | ............. | B30B 15/142 137/596.16 |
| 6,062,260 A * | 5/2000 | Yoshimura | .......... | F15B 13/0405 137/596.14 |
| 6,109,301 A * | 8/2000 | Pfetzer | ............... | B60H 1/00485 137/599.14 |
| 6,478,049 B2 * | 11/2002 | Bento | ................... | F15B 20/001 137/596.16 |
| 6,604,547 B1 * | 8/2003 | Bento | .................. | F15B 20/001 137/596.16 |
| 7,946,308 B2 * | 5/2011 | Teach | .................. | F16K 99/0001 137/15.18 |
| 8,028,717 B2 * | 10/2011 | Foster | .................. | F15B 20/001 137/596.16 |
| 2011/0000563 A1 * | 1/2011 | Ito | .......................... | F16K 11/22 137/596.17 |

FOREIGN PATENT DOCUMENTS

JP 2018-076941 A 5/2018

* cited by examiner

*Primary Examiner* — John Fox
(74) *Attorney, Agent, or Firm* — Oblon, McClelland, Maier & Neustadt, L.L.P.

(57) ABSTRACT

A cross-flow dual valve has a supply path, an exit path, and first and second valve holes through which the supply path and the exit path communicate with each other. The cross-flow dual valve has a first intersecting path through which a supply path side of the first valve hole and an exit path side of the second valve hole communicate with each other. The cross-flow dual valve has a second intersecting path through which a supply path side of the second valve hole and an exit path side of the first valve hole communicate with each other. The cross-flow dual valve includes a first valve and a second valve. The first valve includes a first lower valve body and a first spool. The second valve includes a second lower valve body and a second spool.

2 Claims, 8 Drawing Sheets

FIG. 3
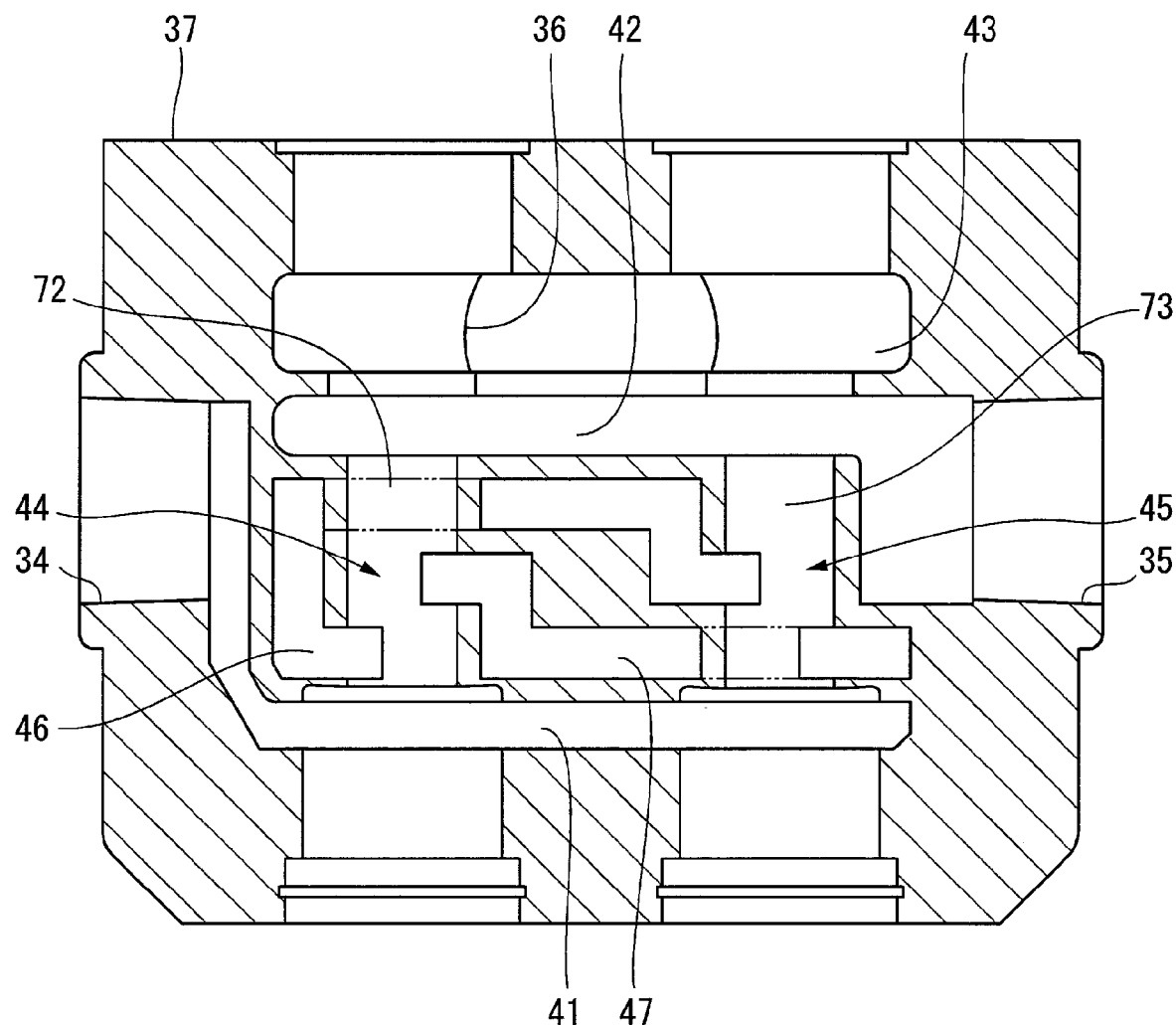
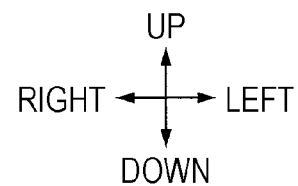

CROSS-FLOW DUAL VALVE AND METHOD OF MANUFACTURING HOUSING OF THE CROSS-FLOW DUAL VALVE

CROSS-REFERENCE TO RELATED APPLICATIONS

The present application is based on and claims priority to Japanese Application No. 2018-156993, filed Aug. 24, 2018, the entire contents of which are incorporated herein by reference.

BACKGROUND

1. Field

The present disclosure relates to cross-flow dual valves that control, for example, air clutches, air brakes, or the like of machine presses. The present disclosure also relates to a method of manufacturing housings of these cross-flow dual valves.

2. Description of the Related Art

As related-art dual valves that control air clutches, air brakes or the like of machine presses, there exit, for example, a parallel-flow dual valve as described in Japanese Unexamined Patent Application Publication No. 2018-76941 and a cross-flow dual valve. As illustrated in FIG. 10, in the parallel-flow dual valve, when a pair of valves 1, 2 inserted into respective valve holes 3, 3 move downward in FIG. 10 so as to be opened, air flows from a supply path 4 to an exit path 5 through the valve holes 3, 3. The valve holes 3, 3 are bored in a housing 6 so as to be open at one end portion (upper end portion in FIG. 10) of the housing 6. An air clutch (not illustrated), an air brake (not illustrated), or the like is connected to the exit path 5.

The exit path 5 communicates with an air discharge path 7 through the valve holes 3, 3. The valves 1, 2 illustrated in FIG. 10 include lower valve bodies 8, upper valve bodies 9, and pistons 10. Each of the lower valve bodies 8 opens/closes an end portion of a corresponding one of the valve holes 3, 3 on a supply path side. Each of the upper valve bodies 9 opens/closes an end portion of a corresponding one of the valve holes 3, 3 on an air discharge path side such that open/close states set by the upper valve bodies 9 are opposite to those set by the lower valve bodies 8. The pistons 10 are integral with the upper valve bodies 9. The pistons 10 receive the pressure of compressed air fed from pilot valve units 11, 12 that include solenoid valves. The valves 1, 2 move downward in FIG. 10 so as to be opened when the pistons 10 receive the pressure of the compressed air. Furthermore, when the air pressure pressing the pistons 10 is lost, the valves 1, 2 are closed by being pressed by spring forces of spring members 13 that upwardly urge the lower valve bodies 8.

As illustrated in FIG. 11, the cross-flow dual valve has first and second intersecting paths 14, 15 through which a pair of the valve holes 3, 3 communicate with each other. The supply path side of the first valve hole 3a positioned on the left side in FIG. 11 and an exit path side of the second valve hole 3b positioned on the right side in FIG. 11 of the pair of valve holes 3, 3 communicate with each other through the first intersecting path 14 indicated by solid lines in FIG. 11. An exit path side of the first valve hole 3a and the supply path side of the second valve hole 3b communicate with each other through the second intersecting path 15.

The valves 1, 2 used for the cross-flow dual valve have respective spools 16. The spool 16 of the valve 1 positioned on the left side in FIG. 11 opens/closes a path extending from the second intersecting path 15 to the exit path 5 through the first valve hole 3a. The spool 16 of the other valve 2 opens/closes a path extending from the first intersecting path 14 to the exit path 5 through the second valve hole 3b.

The housing 6 of the related-art cross-flow dual valve has the first intersecting path 14 and the second intersecting path 15 that have complex structures. Thus, as illustrated in FIG. 12, the housing 6 includes a housing main body 17 having the first and second valve holes 3a, 3b and a channel component 18 attached to the housing main body 17. The housing 6 is completed by attaching the channel component 18 to the housing main body 17. The housing main body 17 has the first and second valve holes 3a, 3b and a plurality of recesses 17a to 17f for forming paths. The channel component 18 has a plurality of recesses 18a to 18f for forming paths, an inlet 4a of the supply path 4, an outlet 5a of the exit path 5, and an air discharge port 7a of the air discharge path 7.

The first intersecting path 14 of the housing 6 illustrated in FIG. 12 is formed by the recesses 17d, 17e, the recesses 18d, 18e, and so forth. The recesses 17d, 17e are formed in the housing main body 17 so as to be connected to the first valve hole 3a and the second valve hole 3b. The recesses 18d, 18e are formed in the channel component 18 so as to be connected to the recesses 17d, 17e. The recess 18d and the recess 18e communicate with each other through a hole 19 bored in the channel component 18.

The second intersecting path 15 is formed by the recess 17c and the recess 18c. The groove-shaped recess 17c is formed in the housing main body 17 so as to extend from the first valve hole 3a to the second valve hole 3b. The recess 18c is formed in the channel component 18 so as to be connected to the recess 17c. The channel component 18, which has a complex structure, is formed by die casting.

SUMMARY

The housing 6 of the related-art cross-flow dual valve needs the channel component 18 including a die cast component in addition to the housing main body 17 having the first valve hole 3a and the second valve hole 3b. Thus, there is a problem in that the cost is high. Furthermore, so-called "sink marks" may be formed in the channel component 18 including the die cast component due to shrinkage in molding. In such a case, a gasket (not illustrated) that seals a gap between the housing main body 17 and the channel component 18 is not necessarily sufficiently compressed, and accordingly, air leakage may occur.

A first object of the present disclosure is to provided a cross-flow dual valve which does not need a channel component including a die cast component and in which air leakage is unlikely to occur. Furthermore, a second object of the present disclosure is to provide a method of manufacturing the cross-flow dual valve with which the first and second intersecting paths can be formed without using the channel component including the die cast component.

In order to achieve the above-described objects, a cross-flow dual valve according to the disclosure includes a supply path, an exit path, first and second valve holes, a first intersecting path, a second intersecting path, a first valve, and a second valve. The supply path extends in a first direction in a housing main body. The exit path is spaced from the supply path in a second direction perpendicular to the first direction in the housing main body and extends in the first direction in the housing main body. The first valve hole and the second valve hole extend in the second direction. The supply path and the exit path communicate with each other through the first valve hole and the second valve hole. A supply path side of the first valve hole and an exit path side of the second valve hole communicate with each other through the first intersecting path. A supply path side of the second valve hole and an exit path side of the first valve hole communicate with each other through the second intersecting path. The first valve includes a first valve body and a first spool. The first valve body opens and closes an end portion of the first valve hole on the supply path side. The first spool opens and closes a first path which extends from the second intersecting path to the exit path through the first valve hole. The second valve includes a second valve body and a second spool. The second valve body opens and closes an end portion of the second valve hole on the supply path side. The second spool opens and closes a second path which extends from the first intersecting path to the exit path through the second valve hole. The first intersecting path and the second intersecting path are formed by respective grooves and a lid, the grooves are provided in the housing main body such that the grooves are open in a direction intersecting the first direction and the second direction, and the lid is attached to the housing main body such that the lid closes opening portions of the grooves.

A method of manufacturing a housing of a cross-flow dual valve according to the present disclosure includes the steps of molding a housing main body by casting, processing to form a first valve hole and a second valve hole in the housing main body by machining, and assembling to form the housing by attaching a plate-shaped lid to the housing main body. The step of molding forms a supply path, an exit path, a first groove, and a second groove. The supply path extends in a first direction in the housing main body. The exit path is spaced from the supply path in a second direction perpendicular to the first direction in the housing main body and extends in the first direction in the housing main body. The first groove is open in a direction perpendicular to the first direction and the second direction, extends in the first direction, and has one end portion positioned on a supply path side and another end portion positioned on an exit path side. The second groove is open in the direction perpendicular to the first direction and the second direction, extends in the first direction, and has one end portion positioned on an exit path side and another end portion positioned on a supply path side. The step of processing forms a first valve hole and a second valve hole. The first valve hole extends in the second direction in the housing main body so as to penetrate through the supply path and the exit path and is connected to the one end portion of the first groove and the one end portion of the second groove. The second valve hole extends in the second direction in the housing main body so as to penetrate through the supply path and the exit path and is connected to the other end portion of the first groove and the other end portion of the second groove. In the step of assembling, the lid is attached to the housing main body such that the lid closes opening portions of the first groove and the second groove.

According to the present disclosure, the first and second intersecting paths are formed by the grooves of the housing main body and the plate-shaped lid. Thus, the housing can be formed without using a die cast component other than the housing main body. Strain is unlikely to occur in the plate-shaped lid during processing, and accordingly, air leakage between the housing main body and the lid is unlikely to occur. Thus, according to the present disclosure, compared to the related-art cross-flow dual valve, the cross-flow dual valve the manufacturing cost of which is reduced and in which air leakage is unlikely to occur can be provided.

In the method of manufacturing the housing of the cross-flow dual valve according to the present disclosure, the housing is manufactured by attaching the plate-shaped lid to the housing main body formed by casting. Thus, with this method, the housing of the cross-flow dual valve that reduces the likelihood of the occurrences of air leakage can be formed at a reduced cost.

BRIEF DESCRIPTION OF THE DRAWINGS

FIG. 3 is a sectional view of a housing main body;

DETAILED DESCRIPTION

An embodiment of a cross-flow dual valve and a method of manufacturing the cross-flow dual valve according to the present disclosure are described in detail below with reference to FIGS. 1 to 9.

Figure 1:
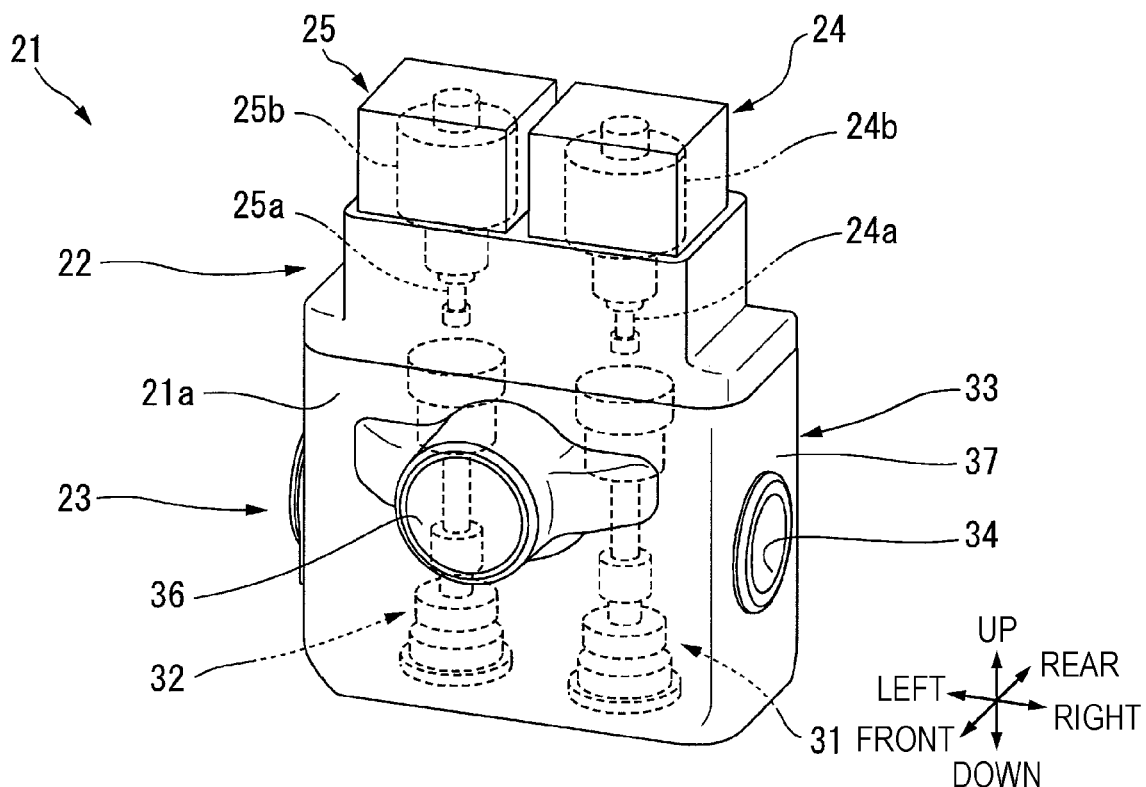
FIG. 1 is a perspective view of a cross-flow dual valve according to the present disclosure.

A cross-flow dual valve (simply referred to as "dual valve" hereinafter) 21 illustrated in FIG. 1 controls, for example, operations of an air clutch, an air brake, or the like of a press machine (not illustrated). This dual valve 21 includes a pilot valve unit 22 and a main valve unit 23. The pilot valve unit 22 is positioned above the main valve unit 23 in FIG. 1. Operations of the main valve unit 23 are switched by the pilot valve unit 22.

High reliability is required for the dual valve 21 that controls operations of a machine press. Accordingly, two sets of main components are provided in each of the main valve unit 23 and the pilot valve unit 22 of the dual valve 21.

The pilot valve unit 22 includes a first solenoid valve 24 and a second solenoid valve 25. The first solenoid valve 24 switches operations of a first valve 31 provided in the main valve unit 23. The second solenoid valve 25 switches operations of a second valve 32 provided in the main valve unit 23. Hereinafter, in indication of the directions in description of the structure of the dual valve 21, for convenience of description, a surface of the dual valve 21 directed to the lower left in FIG. 1 is referred to as a front surface 21a, and, when seeing the dual valve 21 so as to face the dual valve 21, an upper portion is referred to as an upper portion of the dual valve 21 and a right portion is referred to as a right portion of the dual valve 21.

The first solenoid valve 24 and the second solenoid valve 25 respectively include valve portions 24a, 25a and solenoid portions 24b, 25b. The first solenoid valve 24 and the second solenoid valve 25 are in either a drive mode or a non-drive mode. In the drive mode, driving air is supplied to uppermost portions of the first valve 31 and the second valve 32. In the non-drive mode, supply of the driving air is stopped and air is discharged from the uppermost portions of the first valve 31 and the second valve 32. Compressed air supplied from a supply source (not illustrated) to the main valve unit 23 is used as the driving air.

Figure 2:
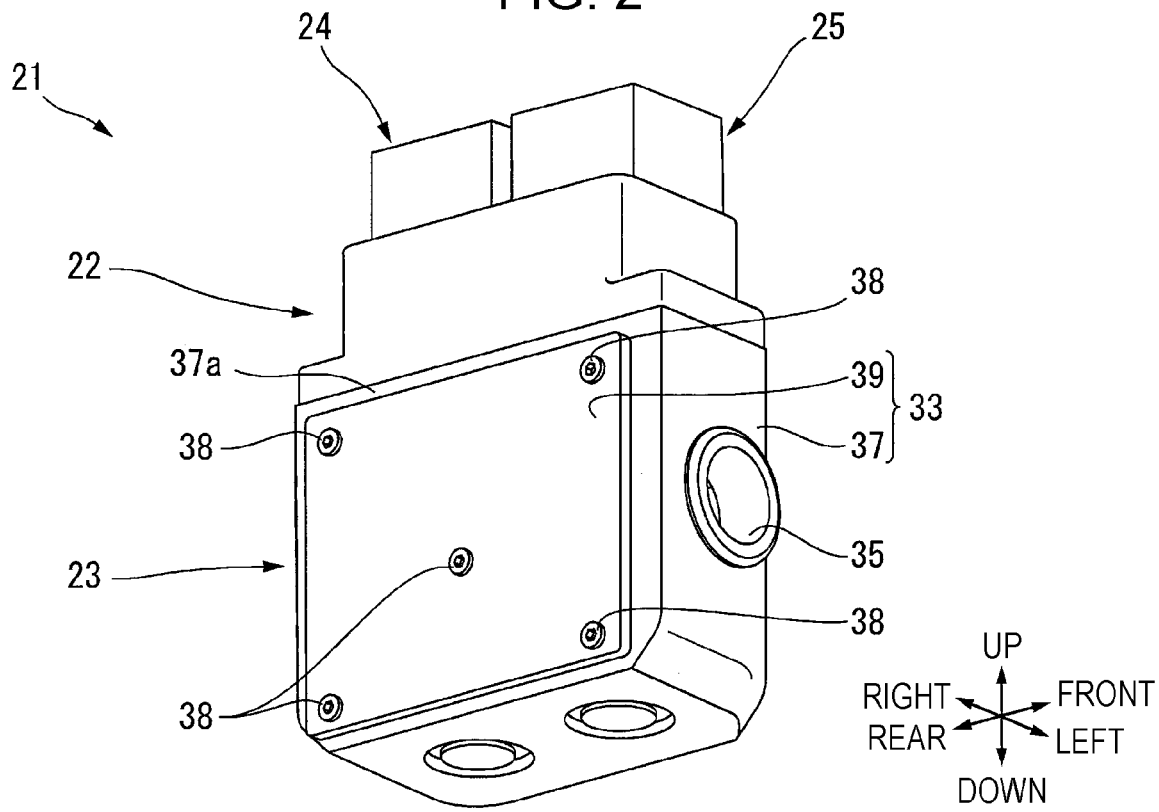
FIG. 2 is a perspective view of the cross-flow dual valve according to the present disclosure.

The main valve unit 23 includes a housing 33 and the first and second valves 31, 32 provided in the housing 33. As illustrated in FIGS. 1 and 2, the housing 33 includes a housing main body 37 and a lid 39. The housing main body 37 has openings such as an inlet 34 (see FIG. 1), an outlet 35 (see FIG. 2), and an air discharge port 36 (see FIG. 1). The lid 39 is attached to a rear surface 37a of the housing main body 37 by using a plurality of attaching bolts 38 (see FIG. 2). The housing main body 37 is formed to have a predetermined shape by casting and machining. The lid 39 is formed by cutting a plate material (not illustrated) into a predetermined shape and size.

The inlet 34 is formed at a right end portion of the housing main body 37 and, as illustrated in FIG. 3, connected to a supply path 41 that extends in the left-right direction in a lower end portion of the housing main body 37. According to the present embodiment, the left-right direction in FIG. 3 corresponds to a "first direction" of the present disclosure.

The outlet 35 is formed at a left end portion of the housing main body 37 and connected to an exit path 42 that extends in the left-right direction above the supply path 41. The exit path 42 is spaced form the supply path 41 in the up-down direction. According to the present embodiment, the up-down direction corresponds to a "second direction perpendicular to the first direction" of the present disclosure. That is, the exit path 42 is spaced from the supply path 41 in the second direction and extends in the first direction in the housing main body 37.

The air discharge port 36 is formed at a front portion of the housing main body 37 and connected to an air discharge path 43 that extends in the left-right direction above the exit path 42.

Figure 4:
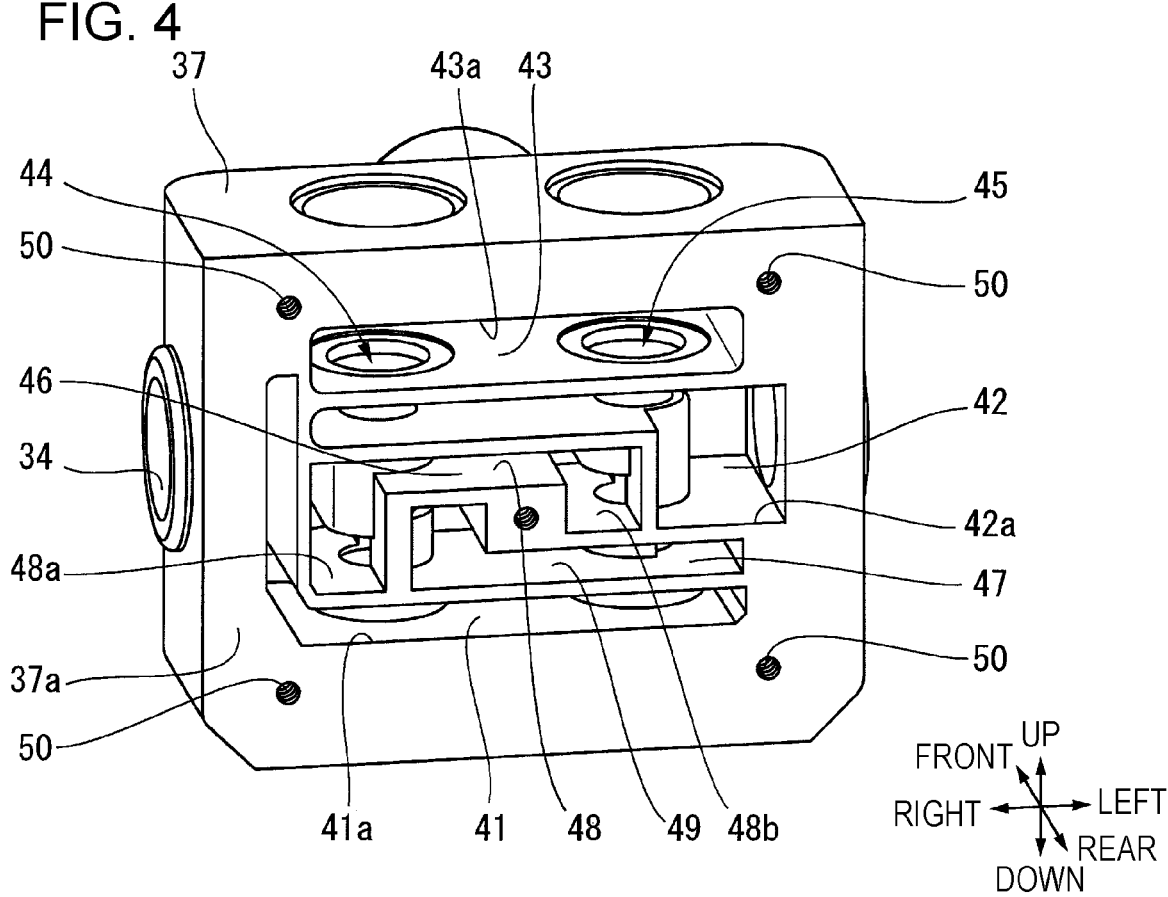
FIG. 4 is a perspective view of the housing main body.
Figure 5:
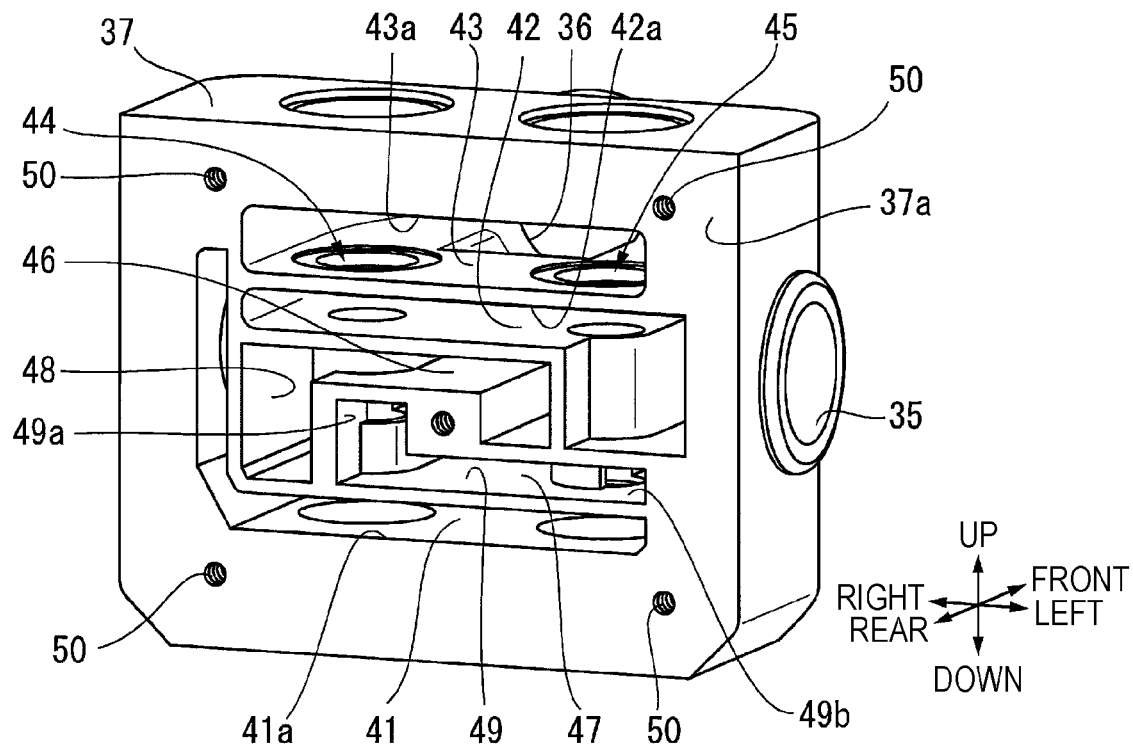
FIG. 5 is a perspective view of the housing main body.

As illustrated in FIGS. 4 and 5, the supply path 41, the exit path 42, and the air discharge path 43 are open at the rear surface 37a of the housing main body 37. An opening 41a of the supply path 41, an opening 42a of the exit path 42, and an opening 43a of the air discharge path 43, which are open at the rear surface 37a of the housing main body 37, are closed when the lid 39 is attached to the housing main body 37.

As illustrated in FIG. 3, the supply path 41 and the exit path 42 communicate with each other through first and second valve holes 44, 45 extending in the up-down direction in the housing main body 37. The first and second valve holes 44, 45 according to the present embodiment have respective openings having circular shapes in section and penetrate through the housing main body 37 in the up-down direction. Thus, the air discharge path 43 communicates with the exit path 42 through the first and second valve holes 44, 45. The first and second valve holes 44, 45 are formed by machining performed on the housing main body 37 after casting.

The first valve hole 44 and the second valve hole 45 communicate with each other through first and second intersecting paths 46, 47, which will be described later, between the supply path 41 and the exit path 42. A supply path 41 side of a central portion of the first valve hole 44 positioned between the supply path 41 and the exit path 42 is connected, through the first intersecting path 46, to an exit path 42 side of the second valve hole 45. An exit path 42 side of the central portion of the first valve hole 44 is connected, through the second intersecting path 47, to a supply path 41 side of the second valve hole 45.

The first and second intersecting paths 46, 47 are, as illustrated in FIGS. 4 and 5, formed by using first and second grooves 48, 49 formed in the housing main body 37. The first and second grooves 48, 49 are open in the rear direction. The rear direction is perpendicular to the left-right direction (first direction according to the present disclosure) and the up-down direction (second direction according to the present disclosure).

Opening portions of the first and second grooves 48, 49 are closed by the lid 39 attached to the rear surface 37a of the housing main body 37. That is, when the lid 39 is attached to the housing main body 37, the first intersecting path 46 defined by the first groove 48 is realized and the second intersecting path 47 defined by the second groove 49 is realized.

As illustrated in FIG. 4, the first groove 48 extends upward from one end portion 48a thereof, which is connected to a right half (on the left in FIG. 4) of the first valve hole 44 that is also a supply path 41 side of the first valve hole 44 and further extends toward a second valve hole 45 side along the exit path 42. Another end portion 48b of the first groove 48 is connected to a right half of the second valve hole 45 that is also the exit path 42 side of the second valve hole 45. That is, the first groove 48 extends in the left-right direction such that the one end portion 48a is positioned on a supply path 41 side of the first groove 48 and the other end portion 48b is positioned on an exit path 42 side of the first groove 48.

As illustrated in FIG. 5, the second groove 49 extends downward from one end portion 49a thereof, which is connected to a left half (on the right in FIG. 5) of the first valve hole 44 that is also the exit path 42 side of the first valve hole 44 and further extends toward the second valve hole 45 along the supply path 41. Another end portion 49b of the second groove 49 is connected to the supply path 41 side of the second valve hole 45 at the left half of the second valve hole 45. That is, the second groove 49 extends in the left-right direction such that the one end portion 49a is positioned on an exit path 42 side and the other end portion 49b is positioned on a supply path 41 side.

According to the present embodiment, the first and second grooves 48, 49 correspond to "grooves" of the present disclosure.

Here, a method of manufacturing the housing 33 having various paths, the first and second valve holes 44, 45, and so forth as described above is described with reference to a flowchart illustrated in FIG. 9.

Figure 9:
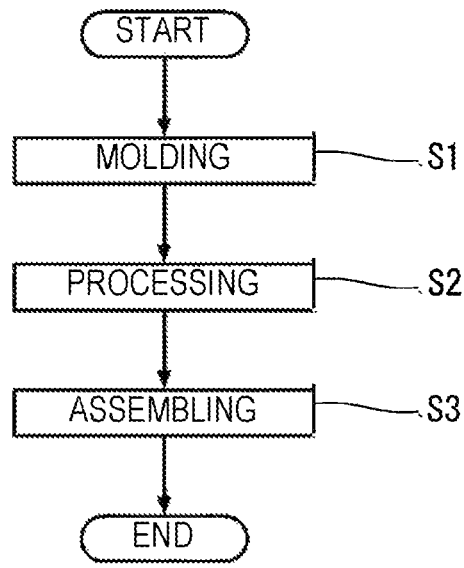
FIG. 9 is a flowchart explaining a method of manufacturing a housing.
Figure 10:
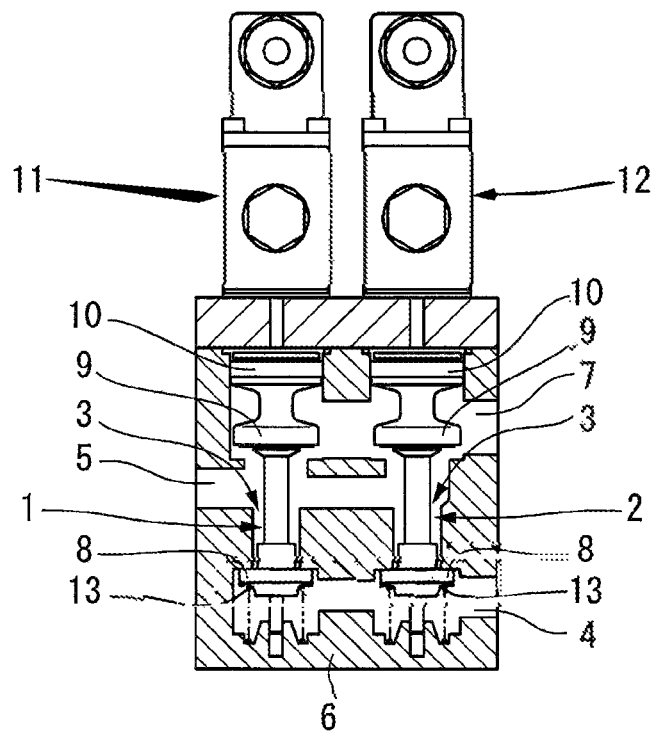
FIG. 10 is a sectional view illustrating the structure of a related-art parallel-flow dual valve.
Figure 11:
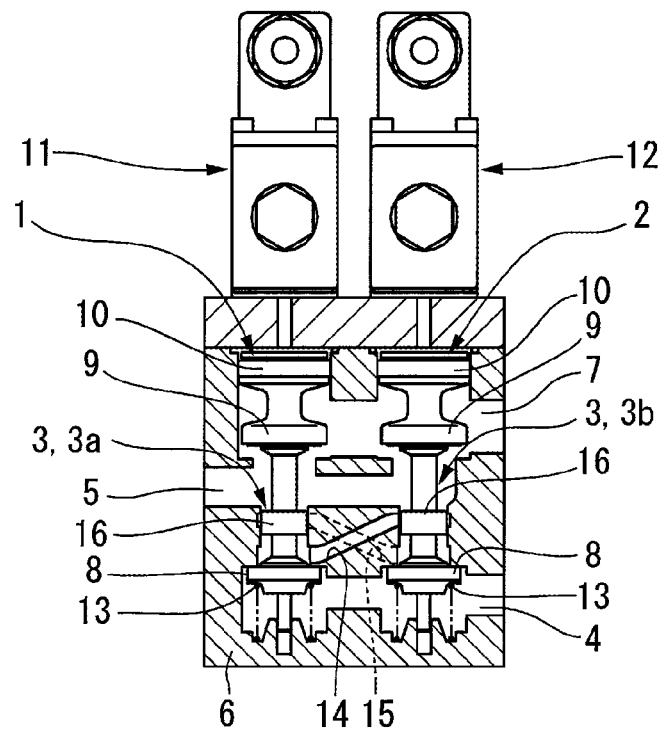
FIG. 11 is a sectional view illustrating the structure of a related-art cross-flow dual valve.
Figure 12:
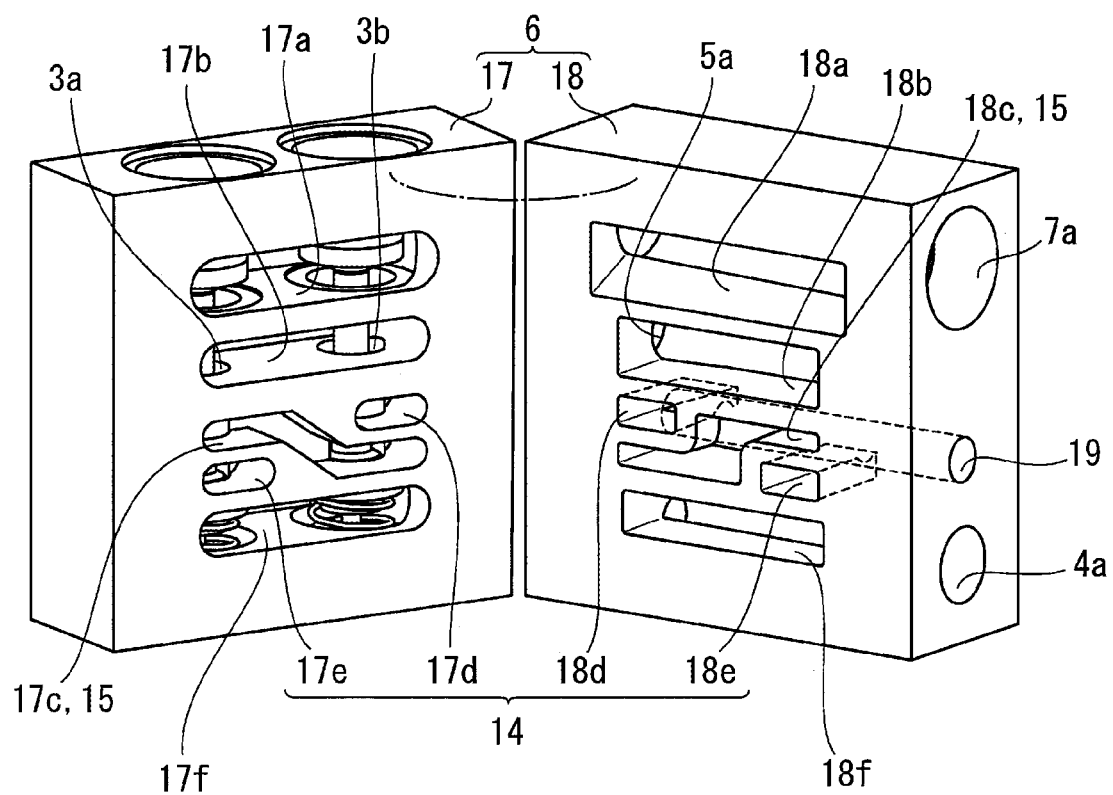
FIG. 12 is an exploded perspective view of a housing of the related-art cross-flow dual valve.

When manufacturing the housing 33 of the dual valve 21 according to the present embodiment, first, the housing main body 37 is formed into a predetermined shape by casting in a molding step S1 in the flowchart illustrated in FIG. 9.

The casting is performed with dies (not illustrated) by die casting, gravity casting, or the like. When the casting is performed, cores are used according to need. In this molding step S1, the supply path 41, the exit path 42, the air discharge path 43, the first groove 48, and the second groove 49 are molded. In the molding step S1, small-diameter holes may be formed through molding in advance at portions where the first and second valve holes 44, 45 are to be formed by using the dies or the cores.

Next, in a processing step S2, the first and second valve holes 44, 45 are formed in the cast housing main body 37. The first and second valve holes 44, 45 are formed by machining with a rotating blade (not illustrated). The first valve hole 44 extends in the up-down direction in the housing main body 37 so as to penetrate through the supply path 41 and the exit path 42 and is connected to the one end portion 48a of the first groove 48 and the one end portion 49a of the second groove 49.

The second valve hole 45 extends in the up-down direction in the housing main body 37 so as to penetrate through the supply path 41 and the exit path 42 and is connected to the other end portion 48b of the first groove 48 and the other end portion 49b of the second groove 49.

In the processing step S2, screw holes 50 for attaching the lid 39 to the rear surface 37a of the housing main body 37 are formed.

After the processing step S2 has been completed, an assembling step S3 is performed. In the assembling step S3, first, the first valve 31, which will be described later, is mounted in the first valve hole 44 and the second valve 32, which will be described later, is mounted in the second valve hole 45 in the housing main body 37. Then, the lid 39 is attached to the rear surface 37a of the housing main body 37 by using the attaching bolts 38. The lid 39 is attached to the housing main body 37 such that the lid 39 closes the opening 41a of the supply path 41, the opening 42a of the exit path 42, the opening 43a of the air discharge path 43, and the opening portions of the first and second grooves 48, 49. In attaching the lid 39 to the housing main body 37, a sealing member (not illustrated) is provided between the housing main body 37 and the lid 39.

Figure 6:
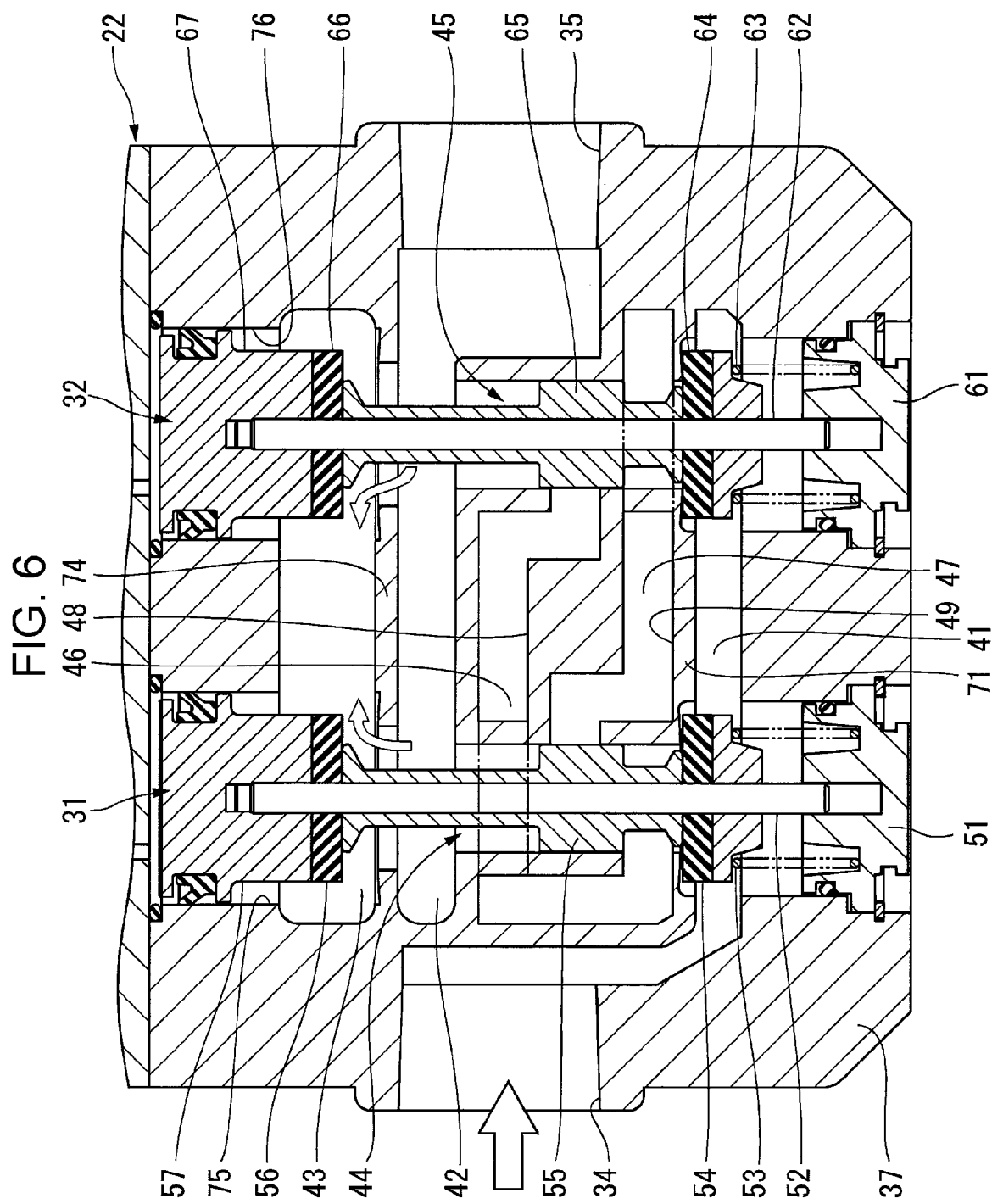
FIG. 6 is a sectional view of a main part of the dual valve.

The first valve 31 and the second valve 32 are structured as illustrated in FIG. 6. The first valve 31 and the second valve 32 are the same.

The first valve 31 includes, for example, a first support plug 51, a first rod 52, a plurality of functional components, and a first spring member 53. The first support plug 51 is secured to a lower end portion of the first valve hole 44. The first rod 52 is supported at the first support plug 51 such that first rod 52 is movable in the up-down direction. The functional components are moved together with the first rod 52. The first spring member 53 upwardly urges the functional components. The functional components of the first valve 31 include, for example, in order from a lower portion of the first valve 31, a first lower valve body 54, a first spool 55, a first upper valve body 56, and a first piston 57.

The second valve 32 includes, for example, a second support plug 61, a second rod 62, a plurality of functional components, and a second spring member 63. The second support plug 61 is secured to a lower end portion of the second valve hole 45. The second rod 62 is supported at the second support plug 61 such that the second rod 62 is movable in the up-down direction. The functional components are moved together with the second rod 62. The second spring member 63 upwardly urges the functional components. The functional components of the second valve 32 include, for example, in order from a lower portion of the second valve 32, a second lower valve body 64, a second spool 65, a second upper valve body 66, and a second piston 67.

Figure 7:
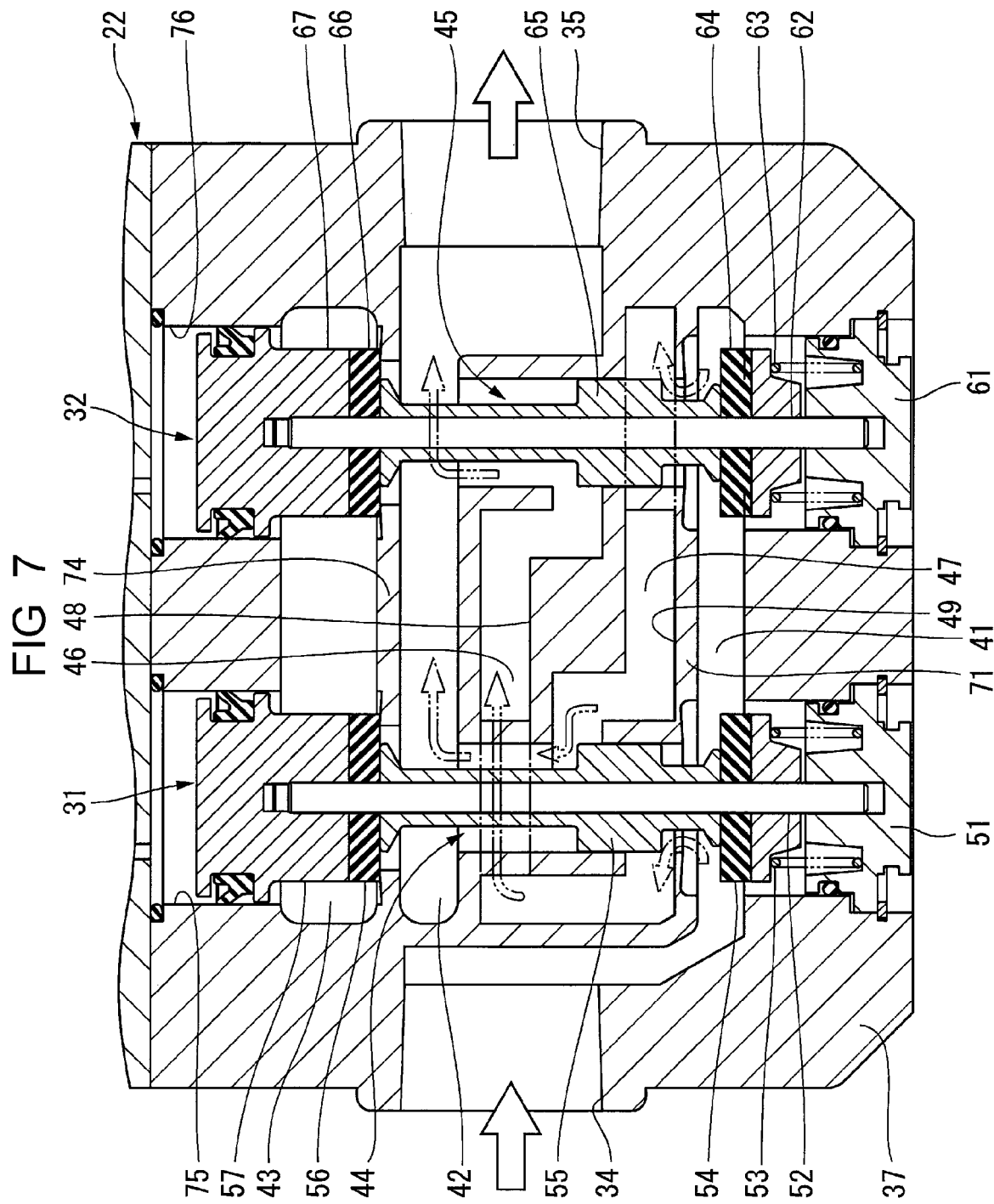
FIG. 7 is a sectional view of the main part of the dual valve.

Each of the first and second lower valve bodies 54, 64 is formed of a rubber material and has a discoidal shape. As illustrated in FIG. 6, when the first valve 31 moves upward relative to the housing main body 37, the first lower valve body 54 is brought into contact with an upper wall 71 of the supply path 41. Thus, an end portion of the first valve hole 44 on the supply path 41 side is closed. Furthermore, as illustrated in FIG. 7, when the first valve 31 moves downward relative to the housing main body 37, the first lower valve body 54 is separated from the upper wall 71. Thus, the end portion of the first valve hole 44 on the supply path 41 side is opened. Thus, the first lower valve body 54 opens/closes the end portion of the first valve hole 44 on the supply path 41 side.

Meanwhile, when the second valve 32 moves upward/downward relative to the housing main body 37, as is the case with the first lower valve body 54, the second lower valve body 64 closes/opens the end portion of the second valve hole 45 on the supply path 41 side. Hereinafter, when the first lower valve body 54 closes the first valve hole 44, it is simply referred to as "the first valve 31 is closed". Also, when the first lower valve body 54 opens the first valve hole 44, it is simply referred to as "the first valve 31 is opened". Likewise, when the second lower valve body 64 closes the second valve hole 45, it is simply referred to as "the second valve 32 is closed". Also, when the second lower valve body 64 opens the second valve hole 45, it is simply referred to as "the second valve 32 is opened". According to the present embodiment, the first lower valve body 54 corresponds to a "first valve body" described in the present disclosure, and the second lower valve body 64 corresponds to a "second valve body" described in the present disclosure.

Each of the first and second spools 55 and 65 has a cylindrical shape. The first spool 55 is movably fitted at the central portion of the first valve hole 44 through which the supply path 41 and the exit path 42 communicate with each other. As illustrated in FIG. 6, when the first valve 31 is closed, the first spool 55 closes an opening portion of the second intersecting path 47 that is open at the first valve hole 44. Furthermore, as illustrated in FIG. 7, when the first valve 31 is opened, the first spool 55 moves down to a position where the first spool 55 does not close the opening portion of the second intersecting path 47 that is open at the first valve hole 44. Thus, the first spool 55 opens/closes a first path 72 (see FIG. 3) extending from the second intersecting path 47 to the exit path 42 through the first valve hole 44.

The second spool 65 is movably fitted at a central portion of the second valve hole 45 through which the supply path 41 and the exit path 42 communicate with each other. Also, as illustrated in FIG. 6, when the second valve 32 is closed, the second spool 65 closes an opening portion of the first intersecting path 46 that is open at the second valve hole 45. Furthermore, as illustrated in FIG. 7, when the second valve 32 is opened, the second spool 65 moves down to a position where the second spool 65 does not close the opening portion of the first intersecting path 46 that is open at the second valve hole 45. Thus, the second spool 65 opens/closes a second path 73 (see FIG. 3) extending from the first intersecting path 46 to the exit path 42 through the second valve hole 45.

Each of the first upper valve body 56 and the second upper valve body 66 is formed of a rubber material and has a discoidal shape. As illustrated in FIG. 6, when the first valve 31 is closed, the first upper valve body 56 moves upward so as to be separated from a separation wall 74 between the exit path 42 and the air discharge path 43. Thus, an end portion of the first valve hole 44 on the air discharge path 43 side is opened. Furthermore, as illustrated in FIG. 7, when the first valve 31 is opened, the first upper valve body 56 is brought into contact with the separation wall 74. Thus, the end portion of the first valve hole 44 on the air discharge path 43 side is closed. Thus, the first upper valve body 56 opens/closes the end portion of the first valve hole 44 on the air discharge path 43 side. Meanwhile, as is the case with the first upper valve body 56, when the second valve 32 is closed, the second upper valve body 66 opens an end portion of the second valve hole 45 on a air discharge path 43 side, and, when the second valve 32 is opened, the second upper valve body 66 closes the end portion of the second valve hole 45 on the air discharge path 43 side.

The first piston 57 is movably fitted at an upper end portion of the first valve hole 44, and the second piston 67 is movably fitted at an upper end portion of the second valve hole 45. When the pilot valve unit 22 is attached to the housing main body 37, the upper end portions of the first and second valve holes 44, 45 are closed by the pilot valve unit 22 so as to be substantially included in cylinders 75, 76. In the drive mode, the pilot valve unit 22 supplies the driving air into the cylinders 75, 76. In the non-drive mode, the pilot valve unit 22 discharges the driving air from the cylinders 75, 76.

The size of the pressure-receiving area of the first and second pistons 57, 67 is set such that the movable components of the first and second valves 31, 32 including the first and second pistons 57, 67 move downward resisting urging forces of the first and second spring members 53, 63 when the pressure of the driving air is applied to the first and second pistons 57, 67. Accordingly, when the pilot valve unit 22 is in the non-drive mode, as illustrated in FIG. 6, the first and second valves 31, 32 move up due to the spring forces of the first and second spring members 53, 63 and are closed. In this case, the compressed air in the supply path 41 does not flow into the exit path 42 through, for example, the first and second valve holes 44, 45 and the first and second intersecting paths 46, 47. Furthermore, in this valve closed state, the first and second upper valve bodies 56, 66 open the end portions of the first and second valve holes 44, 45 on the exit path 42 side. Thus, the compressed air in the exit path 42 is discharged to the air discharge path 43.

Meanwhile, when the pilot valve unit 22 is in the drive mode, as illustrated in FIG. 7, the first and second valves 31, 32 are opened resisting the spring forces of the first and second spring members 53, 63 due to the pressure of the driving air. In this case, the compressed air in the supply path 41 flows from the first valve hole 44 into the exit path 42 through the first intersecting path 46 and the second valve hole 45 (first path 72) and flows from the second valve hole 45 to the exit path 42 through the second intersecting path 47 and the first valve hole 44 (second path 73). In this case, the first upper valve body 56 closes the end portion of the first valve hole 44 on the air discharge path 43 side, and the second upper valve body 66 closes the end portion of the second valve hole 45 on the air discharge path 43. Accordingly, the compressed air fed into the exit path 42 is supplied to a machine press (not illustrated) without leaking toward the air discharge path 43.

Figure 8:
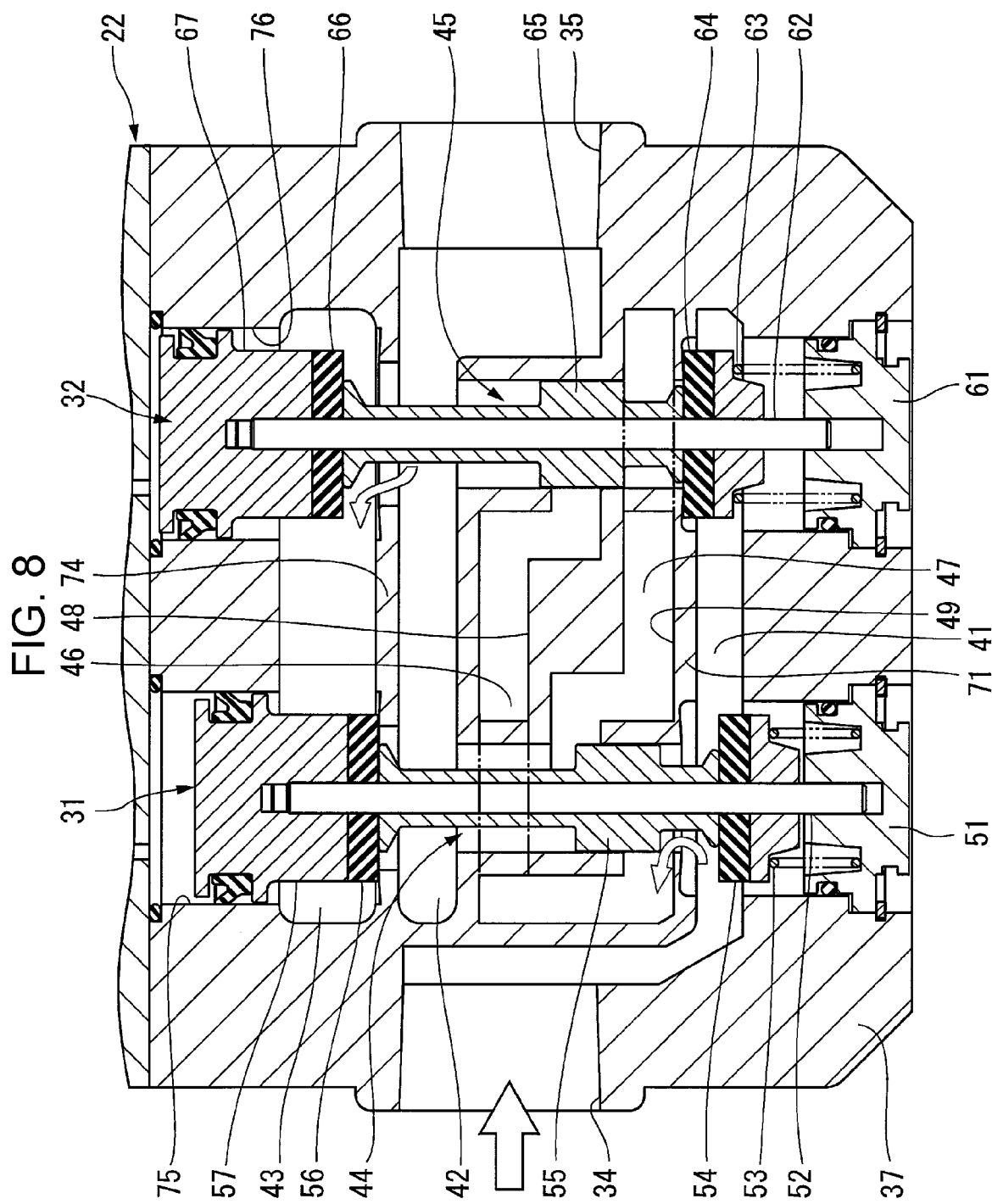
FIG. 8 is a sectional view of the main part of the dual valve.

In this dual valve 21, in the case where one of the first valve 31 and the second valve 32 is not able to be closed due to a certain problem occurring in the one of the first valve 31 and the second valve 32, even when the pilot valve unit 22 transitions from the drive mode to the non-drive mode, one of the valves is maintained in the open state as illustrated in FIG. 8. FIG. 8 illustrates a state in which the first valve 31 is opened and the second valve 32 is closed. In this case, the pressure in the supply path 41 is propagated from the first valve hole 44 to the first intersecting path 46.

However, another end portion of the first intersecting path 46 is closed by the second spool 65 of the second valve 32. Thus, the compressed air flowing into the second valve hole 45 through the first intersecting path 46 at this time is a small amount of air passing through a small gap between the second spool 65 and a hole wall of the second valve hole 45. In this way, the compressed air leaking into the second valve hole 45 flows from the second valve hole 45 into the exit path 42. However, since the second upper valve body 66 has moved up at this time, the end portion of the second valve hole 45 on the air discharge path 43 side is opened. Accordingly, the compressed air flowing into the exit path 42 at this time is discharged to the outside of the dual valve 21 through the air discharge path 43.

In the dual valve 21 structured as described above, the first and second intersecting paths 46, 47 are formed by the first and second grooves 48, 49 of the housing main body 37 and the plate-shaped lid 39. Thus, the housing 33 can be formed without using a die cast component other than the housing main body 37. Since the plate-shaped lid 39 is unlikely to be bent during processing, air leakage between the housing main body 37 and the lid 39 is unlikely to occur.

Thus, according to the present embodiment, compared to the related-art cross-flow dual valve, the cross-flow dual valve the manufacturing cost of which is reduced and in which air leakage is unlikely to occur can be provided.

In the method of manufacturing the housing 33 according to the present embodiment, the housing 33 is manufactured by attaching the plate-shaped lid 39 to the housing main body 37 formed by casting. Thus, with this method, the housing of the cross-flow dual valve that reduces the likelihood of the occurrences of air leakage can be formed at a reduced cost.

What is claimed is:
1. A cross-flow dual valve, comprising:
a first valve; and
a second valve,
wherein the cross-flow dual valve has
a supply path that extends in a first direction in a housing main body,
an exit path that is spaced from the supply path in a second direction perpendicular to the first direction in the housing main body and that extends in the first direction in the housing main body,
a first valve hole and a second valve hole which extend in the second direction and through which the supply path and the exit path communicate with each other,
a first intersecting path through which a supply path side of the first valve hole and an exit path side of the second valve hole communicate with each other, and
a second intersecting path through which a supply path side of the second valve hole and an exit path side of the first valve hole communicate with each other,
wherein the first valve includes
a first valve body that opens and closes an end portion of the first valve hole on the supply path side, and
a first spool that opens and closes a first path which extends from the second intersecting path to the exit path through the first valve hole,
wherein the second valve includes
a second valve body that opens and closes an end portion of the second valve hole on the supply path side, and
a second spool that opens and closes a second path which extends from the first intersecting path to the exit path through the second valve hole, and wherein the first intersecting path and the second intersecting path are formed by respective grooves and a lid, the grooves are provided in the housing main body such that the grooves are open in a direction intersecting the first direction and the second direction, and the lid is attached to the housing main body such that the lid closes opening portions of the grooves.

2. A method of manufacturing a housing of a cross-flow dual valve, the method comprising the steps of:

molding a housing main body by casting;

processing to form a first valve hole and a second valve hole in the housing main body by machining; and assembling to form the housing by attaching a plate-shaped lid to the housing main body, wherein the step of molding forms a supply path that extends in a first direction in the housing main body, an exit path that is spaced from the supply path in a second direction perpendicular to the first direction in the housing main body and that extends in the first direction in the housing main body, a first groove that is open in a direction perpendicular to the first direction and the second direction, that extends in the first direction, and that has one end portion positioned on a supply path side and another end portion positioned on an exit path side, a second groove that is open in the direction perpendicular to the first direction and the second direction, that extends in the first direction, and that has one end portion positioned on an exit path side and another end portion positioned on a supply path side, and wherein the step of processing forms a first valve hole that extends in the second direction in the housing main body so as to penetrate through the supply path and the exit path and that is connected to the one end portion of the first groove and the one end portion of the second groove, and a second valve hole that extends in the second direction in the housing main body so as to penetrate through the supply path and the exit path and that is connected to the other end portion of the first groove and the other end portion of the second groove, and wherein, in the step of assembling, the lid is attached to the housing main body such that the lid closes opening portions of the first groove and the second groove.

\* \* \* \* \*